United States Patent
Hathcox et al.

(10) Patent No.: US 9,758,433 B2
(45) Date of Patent: Sep. 12, 2017

(54) THERMALLY ENHANCED HDD GROUT

(75) Inventors: Joshuah S. Hathcox, The Woodlands, TX (US); Ryan P. Collins, Spring, TX (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 801 days.

(21) Appl. No.: 13/546,830

(22) Filed: Jul. 11, 2012

(65) Prior Publication Data
US 2014/0014341 A1    Jan. 16, 2014

(51) Int. Cl.
| | |
|---|---|
| C04B 16/04 | (2006.01) |
| E21B 33/13 | (2006.01) |
| C04B 28/18 | (2006.01) |
| C09K 8/467 | (2006.01) |
| F24J 3/08 | (2006.01) |

(52) U.S. Cl.
CPC ............ *C04B 28/184* (2013.01); *C09K 8/467* (2013.01); *F24J 3/08* (2013.01); *Y02E 10/10* (2013.01)

(58) Field of Classification Search
None
See application file for complete search history.

(56) References Cited

U.S. PATENT DOCUMENTS

| | | | | |
|---|---|---|---|---|
| 2,017,974 | A * | 10/1935 | Kastner | 417/53 |
| 4,291,008 | A | 9/1981 | Hsu et al. | |
| 4,696,698 | A * | 9/1987 | Harriett | C04B 28/26 106/624 |
| 5,309,999 | A * | 5/1994 | Cowan et al. | 166/293 |
| 5,407,909 | A * | 4/1995 | Goodhue et al. | 507/118 |
| 5,447,197 | A * | 9/1995 | Rae et al. | 166/293 |
| 5,969,012 | A * | 10/1999 | Harris, Jr. | 524/55 |
| 2002/0050232 | A1* | 5/2002 | Yamashita et al. | 106/802 |
| 2005/0166802 | A1 | 8/2005 | Matula et al. | |
| 2006/0243166 | A1* | 11/2006 | Matula et al. | 106/638 |
| 2008/0179059 | A1* | 7/2008 | Hilleary et al. | 166/293 |

FOREIGN PATENT DOCUMENTS

WO    WO-2014/011442    1/2014

OTHER PUBLICATIONS

"PCT International Search Report and Written Opinion", dated Nov. 7, 2013, Appl No. PCT/US2013/049053, "Thermally Enhanced HDD Grout", filed Jul. 2, 2013, 8 pgs.
"PCT International Preliminary Report on Patentability", dated Jan. 22, 2015, Appl No. PCT/US2013/049053, "Thermally Enhanced HDD Grout", filed Jul. 2, 2013, 6 pgs.
AU Examination Report No. 1, dated Mar. 3, 2015, Appl No. 2013289011, "Thermally Enhanced HDD Grout," filed Jul. 2, 2013, 3 pgs.
CA Office Action, dated Jan. 29, 2016, Appln No. 2,873,803, "Thermally Enhanced HDD Grout," filed Jul. 2, 2013, 6 pgs.

* cited by examiner

*Primary Examiner* — Jeffrey Washville
(74) *Attorney, Agent, or Firm* — Polsinelli PC

(57) ABSTRACT

A grout used in horizontal directional drilling including a silica material present in an amount of from about 50% to about 70%, bentonite present in an amount of from about 20% to about 30%, a carbon source present in an amount of from about 5% to about 15%, an inorganic alkaline material present in an amount of from about 0% to about 3%, a fluid loss additive present in an amount of from about 0% to about 1%, a polymeric dispersant present in an amount of from about 0% to about 1%, and a polymeric flow enhancer present in an amount of from about 0% to about 0.5%, all by weight of the grout composition. Methods utilizing the grout include placing conduit in a hole, forming the grout slurry, and placing the grout slurry adjacent to the conduct.

19 Claims, No Drawings

THERMALLY ENHANCED HDD GROUT

BACKGROUND

Heat transfer loops are often placed in the earth to provide for the heating and cooling of residential and commercial spaces. Since ground temperatures are generally similar to room temperatures in buildings, the use of such heat transfer loops can be cost effective alternatives to conventional heating and cooling systems. The installation of such heat transfer loops involves inserting a continuous loop of pipe connected to a heat pump unit into a hole or series of holes in the earth to act as a heat exchanger. A thermally conductive grout is then placed in the hole between the pipe wall and the earth. A heat transfer fluid can be circulated through the underground heat transfer loop to allow heat to be transferred between the earth and the fluid via conduction through the grout and the pipe wall. When the system is operating in a heating mode, a relatively cool heat transfer fluid is circulated through the heat transfer loop to allow heat to be transferred from the warmer earth into the fluid. Similarly, when the system is operating in a cooling mode, a relatively warm heat transfer fluid is circulated through the heat transfer loop to allow heat to be transferred from the fluid to the cooler earth. Thus, the earth can serve as both a heat supplier and a heat sink.

In heat pump systems that are ground sourced, closed loops are often used to exchange heat between the ground and a conditioned space such as an office building or residential house. In certain cases, such as retrofit installations, horizontal directional drilling ("HDD") of boreholes may be an economical way to add ground source heating and cooling to an existing structure. Horizontal boreholes may be drilled under the existing structures without disturbing the building above.

The efficiency of the heat transfer loop is affected by the grout employed to provide a heat exchange pathway and a seal from the surface of the earth down through the hole. The grout needs to have a relatively high thermal conductivity to ensure that heat is readily transferred between the heat transfer fluid and the earth. Further, the grout must form a seal that is substantially impermeable to fluids that could leak into and contaminate ground water penetrated by the hole in which it resides. The hydraulic conductivity, which measures the rate of movement of fluid (i.e., distance/time) through the grout, is thus desirably low. Moreover, the grout needs to have a relatively low viscosity to allow for its placement in the space between the heat transfer loop and the earth without leaving voids that could reduce the heat transfer through the grout. In an attempt to achieve such properties, grouts containing sand to enhance their thermal conductivity have been developed that are extremely labor intensive to prepare. In particular, conventional grouts often require several hundred pounds of sand to render them suitably thermally conductive. Unfortunately, the thermal conductivity that may be achieved by these conventional grouts is limited by the amount of sand that can be incorporated into and properly suspended in the grout. Also, the preparation of such grouts is inflexible in that the concentrations of the components and the mixing procedures must be precise to avoid problems in the field.

Many of the existing grouts for horizontal heat loops require a specialized positive displacement pump like a progressing cavity, rotor-stator style pump. Pumps that may be readily available at HDD sites, such as centrifugal and piston pumps, are typically not recommended. These conventional grouts may also have a low thermal conductivity and may also require the use of a tremie line during installation.

Therefore, a need exists for a thermally enhanced grout for use in sealing a heat transfer loop to the earth. In addition to the grout to have a higher thermal conductivity than conventional grouts, it is desirable that the grout be relatively easy and inexpensive to prepare, and may be installed using traditional grout pumps found on HDD rigs.

BRIEF DESCRIPTION OF THE DRAWINGS

None

DETAILED DESCRIPTION

Grout slurries having an improved thermal conductivity of greater than about 0.4 Btu/hr-ft-° F. may be used to install a conduit in one or more holes in the earth. These grout slurries with high thermal conductivities and relatively low hydraulic conductivities have the ability to form efficient, thermally conductive seals around the conduit. As used in this description, the term "conduit" refers to a material through which fluids and/or solids may flow. The conduit may be hollow to allow the through passage of fluids and/or solids. The conduit may be, for example, a heat transfer loop. It is understood that the earth may be exposed or it may be covered by water such as sea or ocean water.

In some embodiments, the grout slurries may be formed by combining a grout composition that is preferably a one-sack product with water. The term "one-sack product" refers to a form of the grout composition in which its components are combined together in a single container such as a sack, allowing the grout composition to be easily transported to an on-site location where it will be used to form a grout slurry. The resulting grout slurries can be pumped into the hole in the earth and allowed to set in the space between the walls of the conduit and the earth. The term "grout composition" refers to the solids that are typically combined with water, thereby forming a grout slurry. The solids content in the grout slurries can be varied to achieve a desirable thermal conductivity therein and need not be very high to achieve desirable properties in the slurry. In an embodiment, a grout slurry exhibits a relatively high thermal conductivity, a relatively low hydraulic conductivity after setting, and a relatively low pumping viscosity when the amount of the grout composition present in the grout slurry is in the range of from about 35% to about 55% by weight of the grout slurry.

Grout compositions that may be used to form such grout slurries contain components that enhance the various properties of the slurries. In an embodiment, grout compositions comprising bentonite, a silica material, a carbon source, sodium carbonate, a polymeric flow enhancer, and a polymeric dispersant may be used to install a conduit in a hole in the earth. In some embodiments, the grout further comprises a fluid loss additive. In one embodiment, the concentrations of the components in the grout compositions are as follows: a silica material present in an amount of from about 50% to about 70% by weight of the grout composition; bentonite present in an amount of from about 20% to about 30% by weight of the grout composition; a carbon source present in an amount of from about 5% to about 15% by weight of the grout composition; an inorganic alkaline material present in an amount of from about 0% to about 1% by weight of the grout composition; a polymeric dispersant present in an amount of from about 0% to about 0.3% by weight of the grout composition; a polymeric flow enhancer present in an amount of from about 0% to about 0.3% by weight of the grout composition; and optionally a fluid loss additive present in an amount of from about 0% to about 0.5% by weight of the grout composition.

In another embodiment, the concentrations of the components in the grout compositions are as follows: a silica material present in an amount of from about 50% to about 70% by weight of the grout composition; bentonite present in an amount of from about 20% to about 30% by weight of the grout composition; a carbon source present in an amount of from about 5% to about 15% by weight of the grout composition; an inorganic alkaline material present in an amount up to about 1% by weight of the grout composition; a polymeric dispersant present in an amount up to about 0.3% by weight of the grout composition; a polymeric flow enhancer present in an amount up to about 0.3% by weight of the grout composition; and optionally a fluid loss additive present in an amount up to about 0.5% by weight of the grout composition.

Silica Material

The silica material contributes to the good hydraulic conductivity and thermal conductivity exhibited by the grout slurries. The silica material is preferably silica flour, which is a finely ground silica generally having a particle size of less than or equal to about 75 microns. In some embodiments, the silica flour is a 200 mesh high quality silica sand. Examples of other suitable silica materials include condensed silica fume, rice hull ash, or combinations thereof. Condensed silica fume is a by-product of the manufacture of silicon or ferrosilicon, which involves subjecting quartz (when silicon is produced) or quartz and an iron-bearing material (when ferrosilicon is produced) to reduction with coke or coal and wood chips in a furnace. A gaseous suboxide of silicon forms, and a portion of the gaseous suboxide escapes into the atmosphere where it reacts with oxygen and condenses to form the glassy microscopic particles known as condensed silica fume. The particle size of condensed silica fume is generally smaller than about 1 micron. Rice hull ash is the by-product of burning rice hulls and has a particle size generally less than about 36 microns. In some embodiments, the silica may be present in the grout compositions of the invention in an amount in the range of from about 50% to about 70% by weight of the grout composition. In some embodiments, the silica may be present in the grout compositions in an amount in the range of from about 60% to about 65% by weight of the grout composition, or more preferably, about 65% by weight of the grout composition. In a preferred embodiment, the grout composition includes silica flour in an amount of 65% by weight of the grout composition.

Bentonite

Bentonite is a water-swellable clay and its use in the grout compositions serves to enhance the viscosity of the grout slurries such that the solid particles contained therein can be transported to a desired location. The bentonite also contributes to the low hydraulic conductivity of the grout slurries and thus enhances the ability of the slurries to form a good seal between the heat transfer loop and the earth. Examples of suitable bentonite clays for use in the invention include sodium montmorillonite (Wyoming sodium bentonite), Western sodium bentonite, and combinations thereof. The bentonite used in the grout compositions preferably has a 30-mesh grind size, but other grind sizes of the sodium bentonite may also be used. In alternative embodiments, the sodium bentonite may be supplemented by or substituted with other types of swellable clays known in the art such as hectorite. In several embodiments, the bentonite may be present in the grout compositions of the invention in an amount in the range of from about 20% to about 30% by weight of the grout composition. In some embodiments, the bentonite may be present in the grout compositions in an amount in the range of from about 20% to about 25% by weight of the grout composition, or more preferably, about 24% by weight of the grout composition. In a preferred embodiment, the grout composition includes Wyoming sodium bentonite in an amount of about 24% by weight of the grout composition.

Carbon Sources

The carbon source serves to improve the thermal conductivity of the grout slurries. Examples of suitable carbon sources include desulfurized petroleum coke, powdered carbon, flaked graphite, and combinations thereof, with flaked graphite being preferred. Desulfurized petroleum coke is described in U.S. Pat. No. 4,291,008, which is incorporated by reference herein in its entirety. Powdered carbon is an amorphous carbon having a particle size generally less than about 0.8 mm. Flaked graphite is a form of graphite present in gray cast iron that appears in the microstructure as an elongated, curved inclusion. Due to its relatively low resistivity and thin shape, it can become interlaced between the other types of particles in the grout slurries to form a conductive path in the slurries. In an embodiment, flaked graphite is used as the carbon source. In certain embodiments, the carbon source may be present in the grout compositions of the present invention in an amount in the range of from about 5% to about 15% by weight of the grout composition. In some embodiments, the carbon source may be present in the grout compositions in an amount in the range of from about 5% to about 10% by weight of the grout composition, or more preferably, about 10% by weight of the grout composition. In some embodiments, the grout composition includes flaked graphite present in the amount of about 10% by weight of the grout composition.

Inorganic Alkaline Materials

The inorganic, alkaline material useful in various embodiments of the invention includes alkali metal hydroxides, carbonates and bicarbonates, preferably the alkali metal carbonates and still more preferably sodium carbonate. In certain embodiments, the inorganic alkaline materials may be present in the grout compositions of the invention in an amount in the range of from about 0% to about 3% by weight of the grout composition. In an embodiment, the inorganic alkaline materials may be present in the grout compositions of the invention in an amount iup to about 3% by weight of the grout composition. In some embodiments, the inorganic alkaline materials may be present in the grout compositions in an amount in the range of from about 0% to about 1% by weight of the grout composition, or more preferably, to about 0.75% by weight of the grout composition. In another embodiment, the inorganic alkaline materials may be present in the grout compositions of the invention in an amount up to about 1% by weight of the grout composition, or more preferably, up to about 0.75%. In some embodiments, the grout composition includes sodium carbonate present in the amount of about 0.75% by weight of the grout composition.

Flow Enhancers

The enhanced grout may contain a flow enhancer additive as deemed appropriate by one skilled in the art. Examples of suitable flow enhancer additives include partially hydrated polyacrylamide (PHPA) polymers and copolymers. In certain embodiments these polymers generally comprise at least about 30 weight percent acrylic acid. In some embodiments, the flow enhancer may be present in the grout compositions of the present invention in an amount in the range of from about 0% to about 1.0% by weight of the grout composition. In certain embodiments, the flow enhancer may be present in the grout compositions of the present invention in an amount up to about 1.0% by weight of the grout composition, or preferably, up to about 0.3% by weight of the grout composition, or more preferably, up to about 0.1% of the grout composition. In some embodiments, the flow enhancer may be present in the grout compositions of the present invention in an amount of about 0.3% by weight of the grout composition, or more preferably about 0.1% by weight of the grout composition. Various derivatives of such polymers and copolymers, e.g., quaternary amine salts, hydrolyzed versions, and the like, should be understood to be included with the polymer and copolymer categories defined in this specification Polymeric Dispersants Embodiments of the grout compositions of the present invention may comprise a dispersant. The dispersant, among other things, may control the rheology of the grout composition and stabilize the grout composition over a broad density range. A variety of dispersants known to those skilled in the art may be used in accordance with the present invention. An example of a suitable polymeric dispersant comprises 2-acrylamido-2-methyl-propane sulfonic acid (AMPS), which dispersant is commercially available under the trade designation "CFR-3™" dispersant from Halliburton Energy Services, Inc., Duncan, Okla. In certain embodiments, the dispersant may be present in the grout compositions of the invention in an amount in the range of from about 0% to about 1.0% by weight of the grout composition. In some embodiments, the dispersant may be present in the grout compositions in an amount of about 0.3% by weight of the grout composition, or more preferably, about 0.1% by weight of the grout composition.

Fluid Loss Additives

The enhanced grout may contain a fluid loss control additive as deemed appropriate by one skilled in the art. Examples of suitable fluid loss control additives include FILTER-CHEK fluid (i.e., carboxymethyl starch), DURENEX Plus fluid (i.e., a modified lignin), and PAC-R fluid (i.e., polyanionic cellulose), all of which are commercially available from Halliburton Energy Services, Inc., and combinations thereof. In an embodiment, the amount of fluid loss control additive present in the fluid is in a range of from about 0% to about 0.5% by weight of the grout composition, and preferably from about 0% to about 0.3% by weight of the grout composition. In some embodiments, the amount of fluid loss control additive present in the fluid is up to about 0.5% by weight of the grout composition, and preferably up to about 0.3% by weight of the grout composition, and more preferably up to about 0.1% by weight of the grout composition. In some embodiments, the fluid loss control may be present in the grout compositions of the invention in an amount of about 0.3% by weight of the grout composition, or more preferably, about 0.1% by weight of the grout composition. In several embodiments, the grout composition fluid loss additive is PAC-R and is present at about 0.1% by weight of the grout composition.

The grout compositions may further include additional additives as deemed appropriate by one skilled in the art. Suitable additives would bring about desired results without adversely affecting other components in the grouting composition or the properties thereof.

In an embodiment, the grout compositions comprise a silica material in an amount of from about 50% to about 70%, bentonite in an amount of from about 20% to about 30%, a carbon source in an amount of from about 5% to about 15%, an inorganic alkaline material in an amount of from about 0% to about 1%, a polymeric dispersant in an amount of from about 0% to about 0.3%, a polymeric flow enhancer is present in an amount of from about 0% to about 0.3%, and optionally, a fluid loss additive present in an amount of from about 0% to about 0.5%. In another embodiment, the grout compositions comprise a silica material in an amount of from about 50% to about 70%, bentonite in an amount of from about 20% to about 30%, a carbon source in an amount of from about 5% to about 15%, an inorganic alkaline material in an amount up to about 1%, a polymeric dispersant in an amount up to about 0.3%, a polymeric flow enhancer is present in an amount up to about 0.3%, and optionally, a fluid loss additive present in an amount up to about 0.5%.

In a preferred embodiment, the grout compositions comprise a silica material present in an amount of about 65%, bentonite present in an amount of about 24%, a carbon source present in an amount of about 10%, sodium carbonate present in an amount of about 0.75%, a fluid loss additive present in an amount of about 0.1%, a polymeric dispersant present in an amount of about 0.1%, and a polymeric flow enhancer present in an amount of about 0.1%, all by weight of the grout composition.

The grout compositions may be made by combining all of the components in any order and thoroughly mixing the components in a manner known to one skilled in the art. In one embodiment, the grout compositions are manufactured off-site and then shipped as a one-sack product to the location where it is to be used to install an underground conduit.

Methods of installing a conduit in a hole in the earth include placing the conduit in the hole in the earth, mixing one of the foregoing grout compositions, which may be a one-sack product, with water to form a grout slurry, and placing the grout slurry in the hole adjacent to the conduit. The hole in the earth may be a borehole that has been drilled in the earth to a depth sufficient to hold the conduit therein. The hole may be horizontal, sub-horizontal, or directional drilled. The grout slurry may be pumped into the space between the conduit and the walls of the hole until the space is filled with the slurry. After the placement of the grout slurry, it is allowed to set, thus forming a thermally conductive seal between the conduit and the earth. The water utilized in the grout slurry can be water from any source provided that it does not adversely affect the components or properties of the slurry and that it would not contaminate nearby soil. Preferably, fresh water in an amount sufficient to form a pumpable slurry is mixed with the grout composition. The water and the grout composition may be mixed to form the grout slurry using a standard mixing device such as a grouter or other similarly functioning device. In certain embodiments, the grout slurry comprises from about 35% to about 55% of the grout composition by weight of the grout slurry and a balance of the water. In one embodiment, the grout slurry comprises from about 45% to about 55% of the grout composition by weight of the grout slurry and a balance of the water. In another embodiment, the grout slurry comprises from about 45% to about 50% of the grout composition by weight of the grout slurry and a balance of the water. In some embodiments, enough water is used to form a grout slurry having a viscosity of less than about 300 cp when an amount of the grout composition present in the grout slurry is less than or equal to about 55% by weight of the grout slurry.

Pumps useful for pumping the grouts of the invention include standard pumps used in HDD operations, such as a centrifugal pump or a piston pump. Specialty pumps used for grouting, such as rotor-stator pumps, may also be used. It should be noted that may conventional horizontal grouts may not be pumped using a centrifugal pump or a piston pump.

After the grout slurry has set, it the conduit within the hole in the earth and acts as a-heat transfer medium between the conduit and the earth. In one embodiment, the conduit may be a heat transfer loop through which a heat transfer fluid flows. Heat may be transferred between the earth and the heat transfer fluid via the set grout slurry and the walls of the heat transfer loop for the purpose of heating and/or cooling a space such as a building located above the surface of the earth.

The enhanced grouts of the present invention exhibit properties that allow them to be used in the manner described above. The thermal conductivity, k, of the grout slurry varies depending on the particular concentration of the solids in the slurry, with the thermal conductivity increasing as the grout composition increases. Based on measurements taken using a thermal conductivity meter made in-house at Halliburton Energy Services, Inc., the grout slurry has a high thermal conductivity of, for example, greater than or equal to about 0.4 Btu/hr-ft-° F., greater than or equal to about 0.75 Btu/hr-ft-° F., greater than or equal to about 1.0 Btu/hr-ft-° F., greater than or equal to about 1.1 Btu/hr-ft-° F., greater than or equal to about 1.2 Btu/hr-f-° F. greater than or equal to about 1.3 Btu/hr-ft-° F., greater than or equal to about 1.4 Btu/hr-ft-° F., greater than or equal to about 1.5 Btu/hr-ft-° F., or greater than or equal to about 1.6 Btu/hr-ft-° F.

In a preferred embodiment, the enhanced grout slurry comprises less than or equal to about 48% solids by weight of the slurry, and the viscosity of the grout slurry is less than about 225 centipoise (cp) as measured using a FANN 35A rotational viscometer with a 5× torsion spring at 300 rpm. This grout slurry can be pumped into the hole in the earth using grouting machinery that does not require high pressure pumps. The grout slurry also exhibits a desirable gel strength, typically greater than or equal about 100 lbs/100 ft$^2$ for a grout slurry comprising about 48% solids by weight of the grout slurry. In addition, the grout slurry experiences minimal or no subsidence after placement.

In an embodiment, the enhanced grout of the invention may be utilized in a series of holes in which a continuous heat transfer loop has been run. As the number of holes increases, more surface area of earth is exposed for heat transfer. Fewer holes may be required utilizing the enhanced grout of the present invention because of the higher thermal conductivity of the grout as opposed to conventional grouts. Thus, the cost of a heat transfer system, which comprises holes in the earth and a heat transfer loop passing from a heat pump through the holes and back to the heat pump, may be lowered by using the enhanced grouts described herein to seal the holes.

The exemplary enhanced HDD grouts disclosed herein may directly or indirectly affect one or more components or pieces of equipment associated with the preparation, delivery, recapture, recycling, reuse, and/or disposal of the disclosed enhanced HDD grouts. For example, the disclosed enhanced HDD grouts may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary enhanced HDD grouts. The disclosed enhanced HDD grouts may also directly or indirectly affect any transport or delivery equipment used to convey the enhanced HDD grouts to a well site or downhole such as, for example, any transport vessels, conduits, pipelines, trucks, tubulars, and/or pipes used to fluidically move the enhanced HDD grouts from one location to another, any pumps, compressors, or motors (e.g., topside or downhole) used to drive the enhanced HDD grouts into motion, any valves or related joints used to regulate the pressure or flow rate of the enhanced HDD grouts, and any sensors (i.e., pressure and temperature), gauges, and/or combinations thereof, and the like. The disclosed enhanced HDD grouts may also directly or indirectly affect the various downhole equipment and tools that may come into contact with the chemicals/fluids such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

EXAMPLES

The invention having been generally described, the following examples are given as particular embodiments of the invention and to demonstrate the practice and advantages hereof. It is understood that the examples are given by way of illustration and are not intended to limit the specification or the claims to follow in any manner.

Example 1

For each sample all dry materials were pre-blended. Grout slurries were prepared via a Lighting Mixer at approximately 1000 RPM equipped with a straight-type X3 mixer blade. The dry mixture was slowly added to 350 mL of dionized water over a 45 second period. Immediately following the mix the slurry was tested for viscosity, pump ability, fluid loss, and gel strength. Viscosity was tested using a Fann 35A5x viscometer. The viscosity was recorded every minute for ten minutes and then every five minutes for the remaining 20 minutes.

Visual representation of a typical horizontal drilling system was stimulated in the lab using a peristaltic pump on mid to low range speed. The grout was mixed as stated above and pumped through the system using ⅜ inch tubing. The grout was pumped into a stimulated horizontal bore hole and the results were observed.

Gel strength was also tested using the Fann 35A5x viscometer at 3 RPM after 10 seconds, 10 minutes, and 30 minutes. Fluid loss was tested using the filter press at 100 psi for 30 minutes the volume of the filtrate was observed. Samples were aged 24 hours for purposes of grout strength and thermal conductivity testing. Visual observations of the grout characteristics and firmness were recorded and the grout was then tested for thermal conductivity. The grout was remixed and allowed to settle with the probe in the grout for 20 minutes. The thermal conductivity measurements were made with the grout lab test probes four times after 1.5 hours intervals, allowing the probe to cool. Results were computed and fit to a graph. The product was also tested for permeability (ASTM 5084).

BAROTHERM® GOLD, a grout mix available from Halliburton Energy Services, Inc., Duncan, Okla., contains bentonite, sodium carbonate, a polymeric dispersant, and a polymeric flow modifier, provided suspension and reduced hydraulic conductivity. Graphite improved thermal conductivity as well as lubricity of the grout. Silica sand (SSA-1) improved thermal conductivity.

Table 1 depicts the ratio and formulation for a grout composition according to an embodiment of the invention. Tables 2-3 display thermal conductivity, gel strength, and filtration rate results. The results indicate that the formulation from Table 1 can provide adequate gellation and reduction in permeability while maintaining pumpability. In Table 4, the viscosity results quantify pumpability of the proposed formulation. The results also indicate pumpability since the evaluated grout formulation was efficiently pumped through a lab simulated horizontal loop using a peristaltic pump and ⅜" tube as tremie. One of skill in the art will appreciate that when combined, the viscosity results and horizontal heat loop stimulation provide evidence that the grout may potentially pump through an HDD system.

TABLE 1

Lab Barrel Formulation

| SSA-1 | 207 g |
|---|---|
| BAROTHERM ® GOLD | 80 g |
| Graphite | 30 g |
| PAC-R ™ | 0.3 g |
| Water | 350 mL |

TABLE 1-continued

Lab Barrel Formulation

| Grout Weight | 317.3 g |
|---|---|
| Water Weight | 350 g |
| Percent Solids | 47.5% |

TABLE 2

Thermal Conductivity

| Trial Number | Measured Thermal Conductivity, Btu/hr · ft · ° F. |
|---|---|
| 1 | 1.02 |
| 2 | 1.02 |
| 3 | 1.06 |
| Average | 1.03 |
| Result | 1.0 |

TABLE 3

Gel Strength/Fluid Loss

| | Measured Value |
|---|---|
| 10 s gel strength, lb/100 ft$^2$ | 100 |
| 10 min gel strength, lb/100 ft$^2$ | 135 |
| 30 min gel strength, lb/100 ft$^2$ | 160 |
| 30 minute filtrate, ml | 8.8 |

TABLE 4

Viscosity Results

| Time(min) | 300 rpm reading, cP |
|---|---|
| 1 | 225 |
| 2 | 210 |
| 3 | 210 |
| 4 | 210 |
| 5 | 210 |
| 6 | 210 |
| 7 | 215 |
| 8 | 215 |
| 9 | 220 |
| 10 | 220 |
| 15 | 235 |
| 20 | 250 |
| 25 | 265 |
| 30 | 275 |
| Average | 225 |

Example 2

Table 5 shows the change in thermal conductivity of enhanced HDD grouts based on varying the amount of sand, BAROTHERM GOLD, graphite, or fluid loss additive.

TABLE 5

Thermal Conductivity for Various Grout Compositions

| Trial | Thermal Conductivity BTU/ft · hr · ° F. | Lab Barrel | | | | | | |
|---|---|---|---|---|---|---|---|---|
| | | Sand (g) | Barotherm Gold (g) | Graphite (g) | PAC-R (g) | Water (g) | Grout Weight(g) | Percent Solids |
| 1 | 1.0 | 207 | 80 | 30 | 0.3 | 350 | 317.3 | 47.55 |
| 2 | 1.2 | 220 | 75 | 35 | 0.3 | 350 | 330.3 | 48.55 |
| 3 | 1.4 | 210 | 80 | 40 | 0.3 | 350 | 330.3 | 48.55 |
| 4 | 1.6 | 207 | 80 | 45 | 0.3 | 350 | 332.3 | 48.70 |
| 5 | 1.8 | 280 | 65 | 55 | 0 | 350 | 400 | 53.33 |
| 6 | 2.0 | 240 | 65 | 65 | 0 | 350 | 370 | 51.39 |

Center of gravity = 11.30/bag

For thermal conductivity, the results in Tables 4 and 5 demonstrate that when placed correctly, the HDD grout formulation provided in Table 1, and variations in compositions as indicated in Table 5, may achieve a 1.0 to 2.0 Btu/ft-hr-° F. thermal conductivity.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A method of installing a conduit in a hole in the earth, comprising the steps of:
   (a) placing the conduit in at least one hole in the earth, wherein the hole is horizontal, sub-horizontal, or directional drilled;
   (b) mixing a grout composition with water to form a grout slurry having a thermal conductivity greater than about 0.4 Btu/hr-ft-° F., wherein the grout composition comprises a silica material present in an amount of from about 50% to about 70%, bentonite present in an amount of from about 20% to about 30%, a carbon source present in an amount of from about 5% to about 15%, an inorganic alkaline material, wherein the inorganic alkaline material is present in an amount up to about 3%, a polymeric dispersant, wherein the polymeric dispersant is present in an amount of from about 0% to about 1%, and a polymeric flow enhancer, wherein the polymeric flow enhancer is present in an amount up to about 1%, all by weight of the grout composition, wherein the silica material is at least one of silica flour, condensed silica fume, rice hull ash, and combinations thereof, wherein the grout slurry has a viscosity of less than about 300 cp at a grout composition present in the grout slurry of less than or equal to about 55% by weight of the grout slurry; and
   (c) placing the grout slurry in the hole adjacent to the conduit.

2. The method of claim 1, wherein the grout composition is a one-sack product.

3. The method of claim 1, wherein the conduit comprises a heat transfer loop for transferring heat between the earth and a heat transfer fluid flowing through the loop.

4. The method of claim 1, wherein the grout slurry is placed into the hole using a pump.

5. The method of claim 1, wherein the pump is a centrifugal pump.

6. The method of claim 1, wherein the pump is a piston pump.

7. The method of claim 1, wherein the grout composition further comprises up to about 0.5% of a fluid loss additive by weight of the grout composition.

8. The method of claim 1, wherein the fluid loss additive comprises polyanionic cellulose.

9. The method of claim 1, wherein the silica material comprises silica flour.

10. The method of claim 1, wherein the carbon source comprises flaked graphite.

11. The method of claim 1, wherein an amount of the grout composition present in the grout slurry is in a range of from about 35% to about 55% by weight of the grout slurry.

12. The method of claim 1, wherein the grout slurry has a thermal conductivity greater than about 1.0 Btu/hr-ft-° F.

13. The method of claim 1, wherein the grout slurry has a thermal conductivity greater than about 1.2 Btu/hr-ft-° F.

14. The method of claim 1, wherein the grout slurry has a thermal conductivity greater than about 1.4 Btu/hr-ft-° F.

15. The method of claim 1, wherein the polymeric dispersant is present and comprises 2-acrylamido-2-acrylamido-2-methylpropanesulfonic acid (AMPS).

16. The method of claim 1, wherein the polymeric flow enhancer comprises partially hydrated polyacrylamides (PHPA).

17. The method of claim 1, wherein the grout composition comprises a silica material present in an amount of from about 50% to about 70%, bentonite present in an amount of from about 20% to about 30%, a carbon source present in an amount of from about 5% to about 15%, an inorganic alkaline material present in an amount of up to about 3%, a fluid loss additive present in an amount of from about 0% to about 1%, a polymeric dispersant present in an amount of from about 0% to about 1%, and a polymeric flow enhancer present in an amount of up to about 0.3% all by weight of the grout composition.

18. The method of claim 1, wherein the grout slurry has a viscosity of less than about 225 cp at a grout composition present in the grout slurry of less than or equal to about 48% solids by weight of the grout slurry.

19. The method of claim 1, wherein the grout composition comprises a silica material present in an amount of about 65%, bentonite present in an amount of about 24%, a carbon source present in an amount of about 10%, sodium carbonate present in an amount of about 0.75%, a fluid loss additive present in an amount of about 0.1%, a polymeric dispersant present in an amount of about 0.1%, and a polymeric flow enhancer present in an amount of about 0.1%, all by weight of the grout composition.

* * * * *